United States Patent [19]
Arneson

[11] 3,800,555
[45] Apr. 2, 1974

[54] VIBRATION ATTENUATION COUPLING STRUCTURE

[76] Inventor: Harold E. G. Arneson, 2322 W. Lake of the Isles Blvd., Minneapolis, Minn. 55405

[22] Filed: Oct. 30, 1972

[21] Appl. No.: 302,354

[52] U.S. Cl............................ 64/1 V, 64/1 C, 64/6, 64/17 R, 74/574
[51] Int. Cl................................................ F16d 1/00
[58] Field of Search ...... 64/1 V, 1 S, 1 C, 13, 17 R, 64/1 R, 6; 74/574

[56] References Cited
UNITED STATES PATENTS

| | | | |
|---|---|---|---|
| 2,331,160 | 10/1943 | Baker et al. | 64/1 V |
| 2,469,713 | 5/1949 | Coleman | 64/1 R |
| 2,557,542 | 6/1951 | Kapitza | 74/574 |
| 2,770,113 | 11/1956 | Nelles | 64/12 |
| 3,504,573 | 4/1970 | Yoshida | 74/574 |

Primary Examiner—Benjamin W. Wyche
Assistant Examiner—Randell Heald
Attorney, Agent, or Firm—Leo Gregory

[57] ABSTRACT

A mechanical linkage to transmit torque between a pair of machine elements to attenuate the transmission of vibration therebetween consisting of at least one torsionally rigid intermediate link separating a pair of flexible joints defining coupling points of the link, and a counterweight forming a portion of the link beyond one of the joints having a mass calibrated with respect to the mass and moment of inertia of the remainder of the link that said coupling points are made to be a conjugate pair of percussion points of the linkage.

4 Claims, 10 Drawing Figures

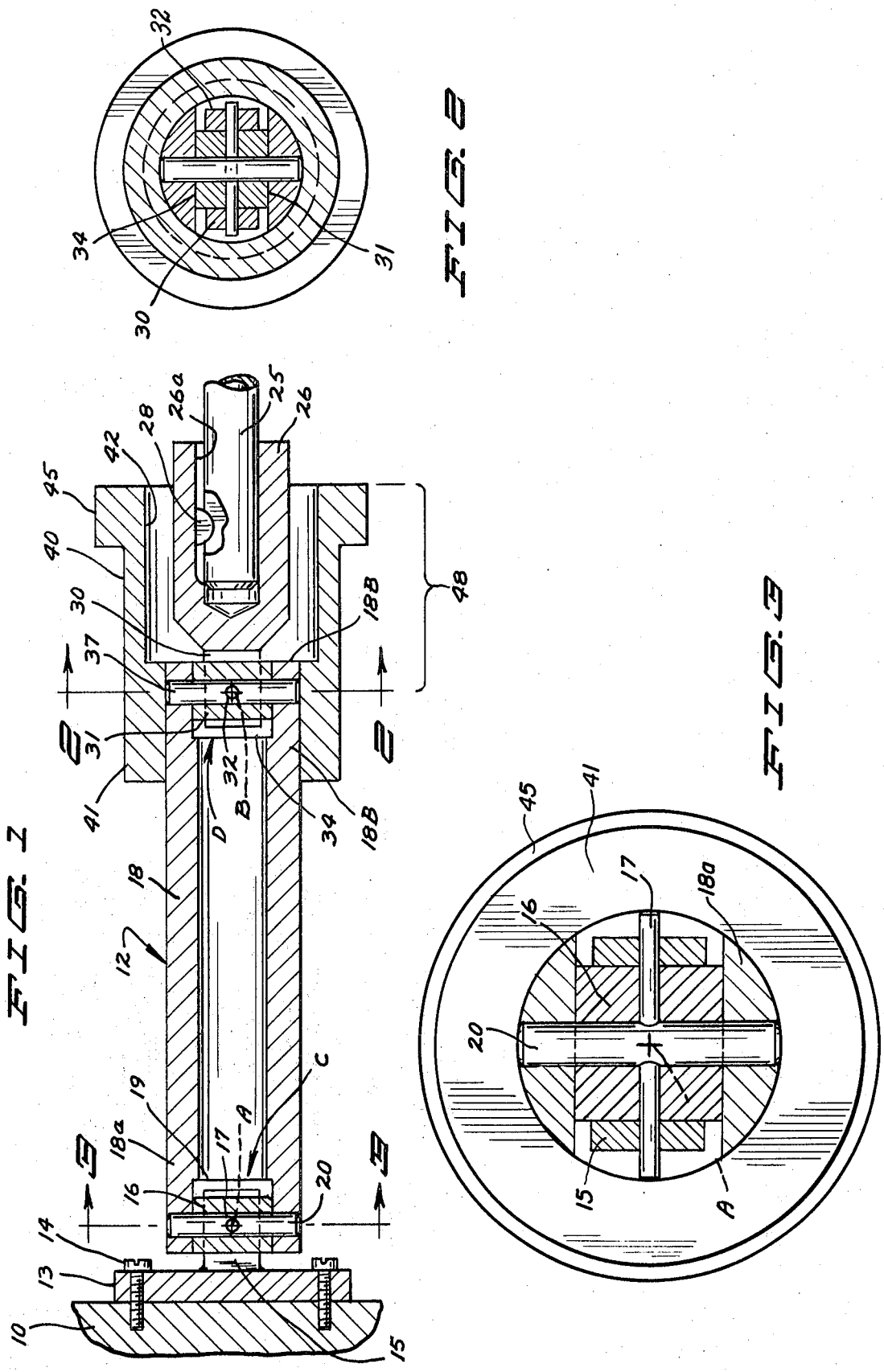

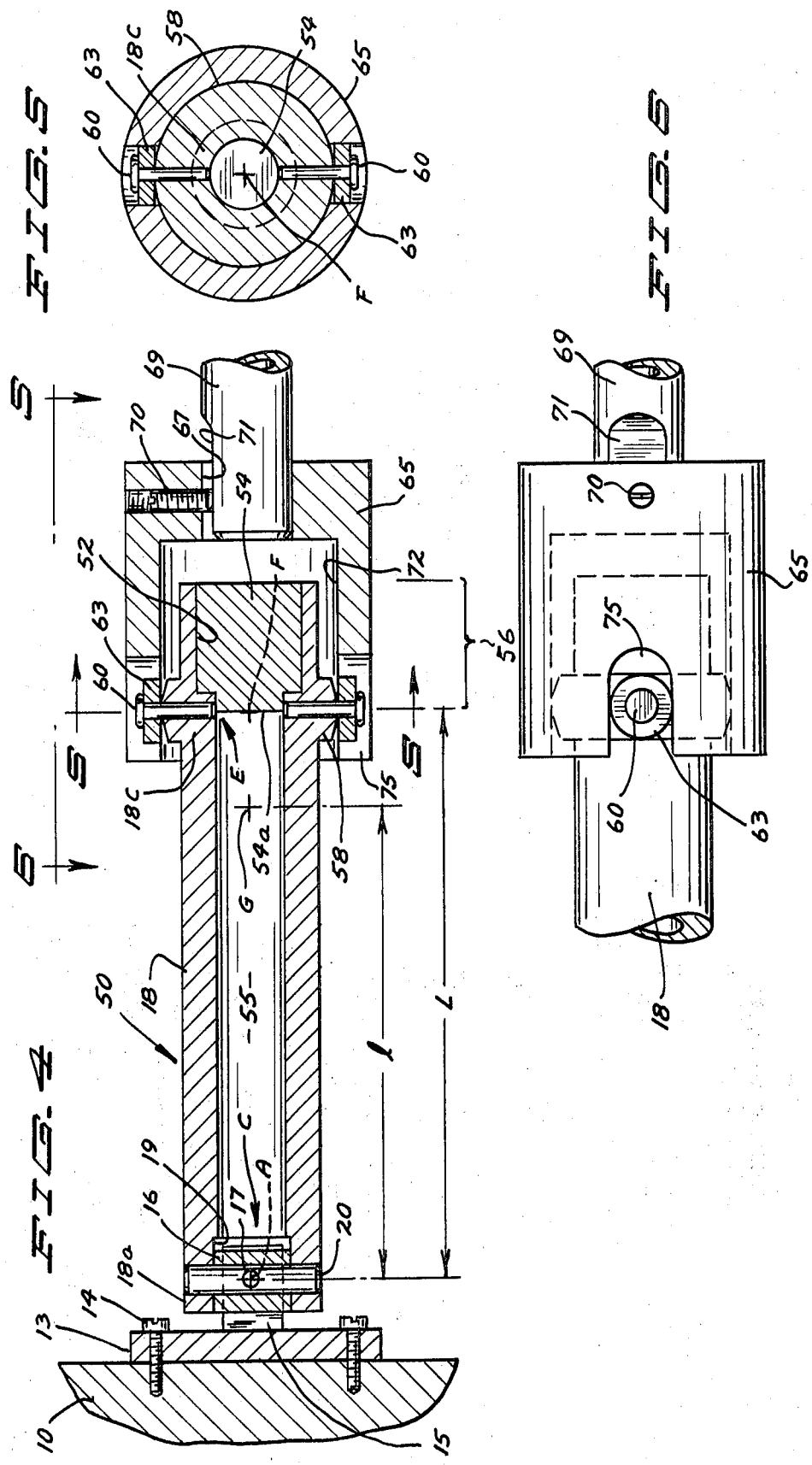

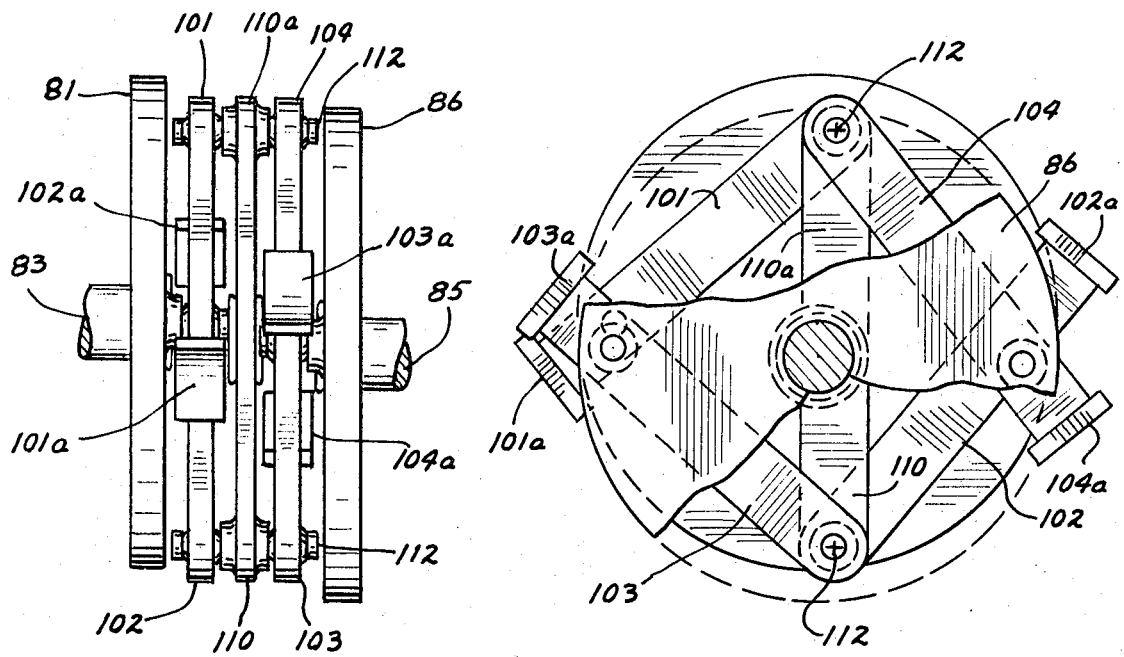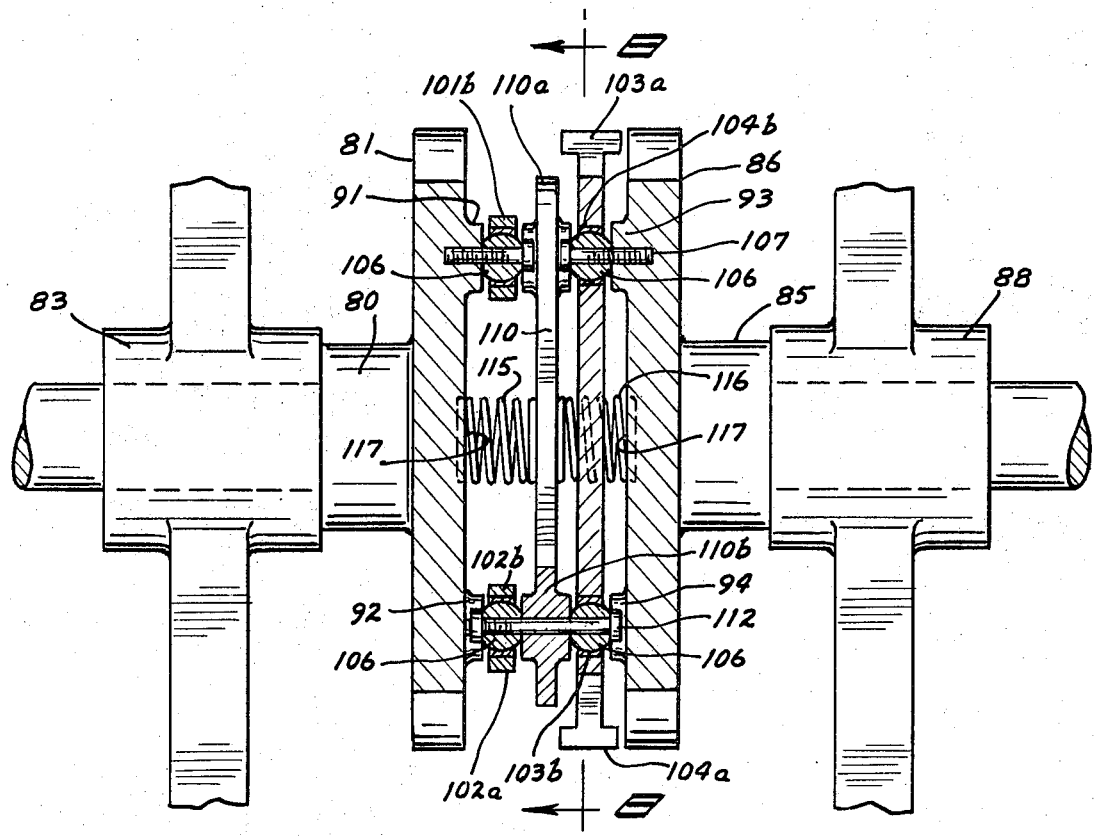

VIBRATION ATTENUATION COUPLING STRUCTURE

SUMMARY AND BACKGROUND OF THE INVENTION

The essential purpose of this invention is to provide for the elimination of the transmission of vibration by means of a torsionally rigid mechanical linkage for a vibration free transmission of torque between two machine elements, said linkage being particularly arranged and constructed to have its joints comprise percussion points with respect to one another.

Relative motion caused by vibration between various machine elements which are cooperatively related often limts the performance or accuracy of the elements.

It is desirable to have a linkage which is freely flexible and capable of considerable misalignment. The linkage must be torsionally rigid and if it is to run at high speeds it should be capable of precise dynamic balancing. The linkage should exert a couple as nearly free as possible from extraneous lateral and axial forces.

One common example of a linkage for achieving the above mentioned purpose consists of a rigid intermediate shaft fitted with a universal joint at each end and another example of such a linkage is a variation of the Oldham coupling wherein two straight line motion linkages at right angles to the axis of the torque are substituted for the sliding motion of the standard Oldham coupling.

Absent modification however, as herein set forth, both of the above types of linkages will transmit considerable vibration because of the inertia of the linkages.

It is an object of the present invention to eliminate the inertial vibration transmission by providing counterweights on one or more intermediate links such that the coupling points of the links are made to be points of percussion relative to one another. It is a property of a rigid body that a transverse instantaneous acceleration impressed on the body at one percussion point causes the body to move in such a way that the rotation of the body about its center of gravity just off sets the translation of the body so that there is no instantaneous acceleration at the other percussion point and consequently no vibration is transmitted between the coupling points.

Vibratory motion may be considered to consist of three components relative to the axis along which a torque is transmitted. Said components are (a) motion transverse to the torque axis i.e., transverse vibration, (b) motion parallel to the torque axis i.e., axial vibration, and (c) vibration about the torque axis i.e., torsional vibration.

In many applications of the invention the axial component of vibration may be negligible or it may be sufficiently attenuated by an axial slip joint included in the linkage, in which case, a single link according to the invention herein will be sufficient for purposes of vibration isolation. One embodiment of the invention herein is also described to illustrate how links according to the invention herein may be disposed perpendicular to the axis of torque transmission in such a way that both transverse and axial vibratory motion is attenuated. The invention herein does not provide for the elimination of torsional vibration and if such vibration is not negligible in any particular instance, it may be dealt with by separate means known in the art.

It will be understood that linkages according to the invention herein may be applied to provide torsionally rigid connections either between moving elements or between stationary elements of vibration isolated machine elements.

It is a general object of this invention to isolate vibration and to minimize its transmission from one machine element to another where a torque is transmitted from one machine element to another.

It is another object of this invention to eliminate the transmission of vibration across a linkage by eliminating the inertial reaction at the opposite coupling points thereof by constructing at least one of the links of the linkage so that its coupling points are made to be a conjugate pair of percussion points of the link.

More generally it is an object of this invention to eliminate the transmission of vibration across a linkage by eliminating the inertial reaction at the opposite coupling points of an intermediate link by adding mass beyond one of the joints of the link, said mass being calibrated with respect to the mass and moment of inertia of the rest of the link so that the coupling points are made to be a conjugate pair of percussion points of the link.

These and other objects and advantages of the invention will be set forth in the following description made in connection with the accompanying drawings in which like reference characters refer to similar parts throughout the several views and in which:

FIG. 1 is a broken view of a linkage in longitudinal vertical section;

FIGS. 2 and 3 are views in vertical cross section taken on lines 2—2 and 3—3 of FIG. 1 as indicated;

FIG. 4 is a modification of the structure herein in longitudinal vertical section;

FIG. 5 is a view in vertical cross section taken on lines 5—5 of FIG. 4 as indicated;

FIG. 6 is a broken top plan view taken on lines 6—6 of FIG. 4 as indicated;

FIG. 7 is a broken view of another modification of the structure herein in longitudinal vertical section taken on lines 7—7 of FIG. 8 as indicated;

FIG. 9 is a view similar to FIG. 7 shown in side elevation; and

FIG. 10 is a view similar to FIG. 8 in vertical section showing portions thereof in alternate position in dotted line and showing a portion thereof being broken away.

DESCRIPTION OF A PREFERRED EMBODIMENT

Figure 8:
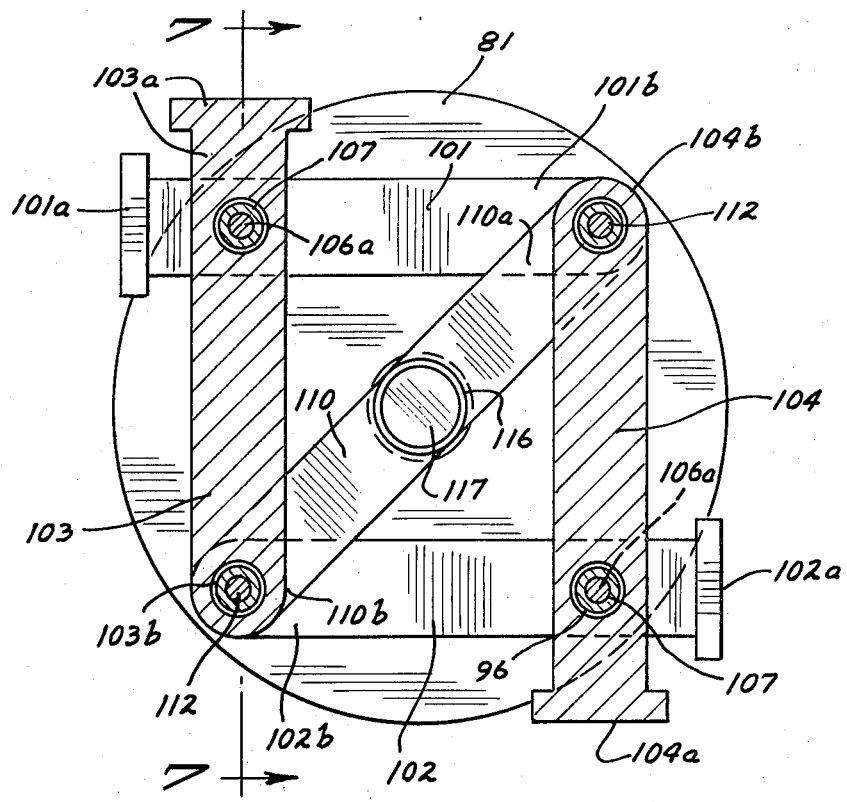
FIG. 8 is a view in vertical cross section taken on lines 8—8 of FIG. 7 as indicated.

For a clear understanding of the language used herein, a machine may be considered to consist of several elements within the frame work of being operatively associated, each element having its own inherent level of vibration. We will call those elements of a machine which tend to transmit vibration energy to quieter elements sources of vibration and those elements which tend to receive vibration sinks of vibration.

Vibration is defined as an unwanted periodic movement of a machine element. Desired relative motion of the machine elements will be simply called relative motion or motion. When elements are in relative motion, an element which is intended to remain stationary with respect to the foundation of a machine will be called a stationary element. Elements intended to have movement relative to stationary elements will be called moving elements. Thus the rotor of a motor is a moving element and the stator of a motor would be called a stationary element. The object of vibration isolation is to minimize the transmission of vibration between sources and sinks.

The embodiments of the invention described herein for purposes of illustration merely illustrate the linkage of the invention as connecting two elements. The linkage according to the invention herein will be applied between moving elements as well as between stationary elements of vibration isolated machine elements.

Referring to FIGS. 1–3, one form of a torsionally rigid linkage is shown as indicated by reference numeral 12 comprising a rigid tubular shaft or link 18 having end portions 18a and 18b. Said shaft has coupled to its end portion 18a a vibration isolated machine element 10 representing a vibration sink and of which only a fragment is shown. Said element could be the rotor of a precision spindle or alternatively it could be the stationary element of a sink.

A flange 13 is rigidly secured to said element 10 by screws 14. Said flange has projecting therefrom a conventional U-shaped fork 15 pivoted to a block 16 by a pin 17. Said shaft 18 is axially slotted at 19 to receive said block 16. Said shaft 18 is pivotly secured to said block 16 by a pin 20 disposed through said block at right angles to said pin 17 and being of sufficient diameter and being apertured to have said pin 17 disposed therethrough. Thus a flexible or universal joint C is arranged at one end of the shaft 18 with said joint being connected to said element 10. The intersection "+" of the axes of the pins 17 and 20 indicated by the character A forms the coupling point about which said joint can flex.

While a form of a Hooke's coupling is described because of its relatively low frictional resistance to flexing, any other type of flexible joint which has a well-defined coupling point is suitable for use.

A second shaft 25 is shown in broken view which by way of example may form a portion of a rotor of a drive element. A collar 26 having a key-way 26a is axially fitted onto the free end of said shaft providing axial movement but relative rotation therebetween is prevented by a conventional key 28 such as a Woodruff key. Said collar 26 has a projecting conventional U-shaped fork 30 which engages with and is pivotly secured to a block 31 by a pin 32.

Said shaft 18 at its end portion 18b has an axial slot 34 to receive said block 31 and said shaft and said block are pivotly secured by a pin 37 which is disposed through said block and is apertured to have said pin 32 disposed therethrough to intersect the same at right angles and thus universal joint D is formed. The intersection "+" of said pins 32 and 37 indicated by the character B indicates the coupling point of said joint D.

A member 40 which may take various suitable forms but which is shown here as a sleeve has one end portion 41 thereof disposed onto the end 18b of said shaft 18 as by a press fit and has a counterbore portion 42 extending outwardly overlying partially said collar 26. An annular boss 45 is disposed about said sleeve 40 at its free end portion outwardly of said coupling point B. The bracketed portion of said sleeve 40 outwardly or beyond said coupling point B comprises a counterweight 48.

The counterweight 48 is proportioned as to its mass and moment of inertia relative to the shaft 18 so that the coupling points A and B are made to be conjugate percussion points of the shaft 18. Further description is given in connection with the modification following hereafter.

The member 40 is here indicated as having the same density as the shaft 18 and is indicated as being attached rigidly with the shaft 18 so far as dynamic characteristics of the invention are concerned.

Said counterweight may be made more compact and of lesser axial extent with the same dynamic effect relative to the extent that its density is higher than the density of said shaft 18 and of the members or portions of members carried by said shaft.

Thus it is believed clear from the description that a torsionally rigid linkage is provided comprising universal and slip joint type of couplings to accommodate misalignment and said pair of coupling points in being made conjugate percussion points prevent the transmission of vibration therebetween.

MODIFICATION

With reference to FIGS. 4–6, a modification of the embodiment above described is shown and is indicated generally by the reference numeral 50 and corresponding portions thereof will be indicated by like reference numerals without further description. The modification of the above described structure relates to the counterweight portion thereof.

The end portion 18c of said shaft 18 is seen to have a counterbore 52 and a high density plug 54 which together with the adjacent portion of the shaft 18 forms the counterweight portion herein and the same is indicated by the bracket 56. Said plug is secured as by a press fit into said counterbore. Said plug has a reduced end portion thereof extending inwardly of the bore 55 of said shaft.

An annular partially spherical boss 58 extends about said shaft having its transverse central axis coinciding with the plane of the surface 54a of the inner end wall of said plug 54. A pair of diametrically opposed flat headed pins 60 extend inwardly of said shaft centrally transversely of said boss extending to said bore 55. Rotatably secured by each of said pins to overlie said boss is a roller 63. Said rollers are circular in form having flat side walls and are held by said pins to have free rotation thereabout. This is one form of a suitable joint structure.

A cup member 65 is provided which may take forms other than as illustrated and is shown having a bore 67 to receive a shaft 69 and a set screw 70 through said collar secures said collar to a flat side 71 of said shaft. Said shaft, of which only a fragmentary view is shown, may run to a driving element representing a vibration source.

Said member 65 has a counterbore 72 of a diameter to slidingly receive said boss 58 and has a pair of diametrically opposed open ended slots 75 to receive said pair of pins 60 and their respective rollers 63 for a freely movable fitting therebetween. Thus a torsionally rigid universal joint E is formed. The intersection "+" of the axes of said pins 60 with the longitudinal axis of said shaft 18 indicates the coupling point F.

The shaft 18 and counterweight 54 are proportioned to make the coupling points A and F conjugate percussion points.

By way of example, with specific reference to the embodiment herein, the material of the shaft may be regarded as having a density of 0.1 lbs/in³ and the plug as having a density of 0.6 lbs/in³. The use of the relatively high density material for the plug results in a considerably more compact counterweight configuration than is the case when the plug and shaft each have the same density.

Referring to FIG. 4, the dimension $l$ represents the distance from the coupling point A to the center of gravity G of the shaft 18 taken as a whole including the counterweight portion 56. The dimension L refers to the distance between the coupling point A considered as one percussion point of the shaft 18 taken with the plug 54 and its conjugate percussion point or coupling point F.

The percussion points are mathematically related by the expression:

$$I = l L m$$

Where $I$ is the moment of inertia of the shaft 18 about transverse axes through the coupling point A, m is the mass of the shaft, and $l$ and $L$ are as above described. The counterweight portion 56 is calibrated with respect to the mass and moment of inertia of the link portion separating the joints C and E so that the coupling points A and F are made to be a conjugate pair of percussion points.

The object in the design of the shaft and counterweight is to make the coupling points coincide as nearly as practicable with the percussion points. To the extent that the points coincide, an instantaneous acceleration applied to either one of the coupling points causes the shaft or link 18 to move in such a way that its rotation about its center of gravity just offsets the translation thereof so that there is no acceleration at the other coupling point, providing that the shaft or link moves as a rigid body.

A shaft or link according to the invention may be considered to be a rigid body to the extent that the frequency of the impressed vibration is on the order of one-half or less than one-half of the fundamental natural frequency of the shaft vibration in the longitudinal mode. Thus a shaft or link according to the invention should be designed to be as stiff and as light weight as possible in view of the other design considerations in order to maximize the natural frequency of the link because vibration frequencies greater than the natural frequency of the shaft or link will not be isolated.

Because of the conjugate nature of percussion points, it makes no difference at which coupling point of the shaft vibration is impressed so far as the dynamics of the shaft and the entire linkage for vibration isolation are concerned.

It will be understood that the formula here given also applies to the structure of the embodiment first above described and the link structure of the embodiment hereinafter described.

The coupling structure herein described is readily disconnected by merely drawing the collar 65 away from the shaft 18. This structure represents a combination universal and slip joint type of coupling, it prevents thrust from being transmitted and it attenuates radial and axial components of vibration.

MODIFICATION

Referring to FIGS. 7–10, another embodiment of the invention herein is shown wherein torque is transmitted between vibration isolated elements by means of a linkage having its links lying transversely with respect to torque axis.

The linkage herein is dynamically similar to the linkage above described except that in the structure herein two straight line motion linkages are disposed at right angles to the torque axis connected by an intermediate link.

Referring to FIGS. 7 and 8, the linkage of this embodiment comprises a shaft 80 having an end flange 81 here indicated as being circular in form with said shaft being journaled in a suitable bearing 83 of one vibration isolated element of a machine and a second shaft 85 having an end flange 86 similar to the flange 81 with said flanges being in spaced facing relation and said shaft 85 being journaled in a suitable bearing 88 of another vibration isolated element of a machine.

Said flange 81 has a pair of diametrically spaced bosses 91 and 92 and said flange 86 has a like pair of bosses 93 and 94, said bosses being in facing relation.

Four identical elongated links 101–104 are provided with each having a counterweighted end portion 101a–104a, said counterweighted end portions to be further described. Said links in a conventional manner as adapted to have rod-end ball like or spherical bearings 106 impressed therein adjacent their counterweighted ends and said bearings are drilled to accommodate screws therethrough. Said link end portions 101a–104a with said bearings 106 therein are respectively secured to said bosses 91–94 by screws 107. Thus said counterweighted end portions 101a and 103a will be in a diametrically opposed relation to said counterweighted end portions 102a and 104a.

The other end portions 101b–104b of said links 101–104 also have spherical bearings 106 impressed therein. An intermediate link 110 plate-like in form is provided having apertured end portions 110a and 110b.

Said link end portions 102b and 103b are respectively secured to said intermediate link end portion 110b at each side thereof by a bolt 112 and the link end portions 101b and 104b are secured to the other end 110a of said intermediate link in like manner by a bolt 112.

Coil springs 115 and 116 are shown disposed at each side of said link 110 and extending to the adjacent faces of the flanges 81 and 86 to center said link 110 and said springs are retained by bosses 117.

Thus as viewed in FIG. 8, the intermediate link 110 is adapted to have substantially a straight line motion relative to the flanged shafts 80 and 85 and said shafts are disposed perpendicular to the line of motion of said link 110.

The spherical centers 106a of the bearing 106 determine the respective coupling points of the links. The counterweighted end portions of said links are proportioned to their respective links so that the coupling points of each link as nearly as practicable coincide with the percussion points for each link for motion about axes perpendicular to the planes of the views as shown in FIGS. 7 and 8. The formula given in the previous embodiment described applies to each of the links.

Thus the complete linkage of this embodiment as described connects the flanged shafts 80 and 85 permitting moderate parallel and angular misalignment while transmitting torque as a linkage and attenuating or preventing the transmission of radial and axial components of vibration.

It will be understood that each of the links 101–104 are within the scope of the structures of the first two embodiments above described and represent a plurality of links of the invention herein cooperatively related.

With reference to FIGS. 9 and 10, the structure above described is shown in a misalignment such as would occur undr operating conditions. The misalignment is particularly indicated by the dotted lines of FIG. 10.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A linkage for transmitting torque between machine elements arranged and constructed to eliminate the transmission of vibrations, having in combination
   a rigid link,
   a pair of flexible joints separated by said link,
   said joints respectively comprising coupling points,
   said link having a portion extending beyond one of said coupling points, said portion being disposed about the joint and the portion of the machine element adjacent thereto,
   said extended portion including means comprising a counterweight, and
   said counterweight comprising a means such that said coupling points are made to be points of percussion relative to one another for preventing transmission of vibration therebetween.

2. A linkage for transmitting torque between machine elements arranged and constructed to eliminate transmission of vibration, having in combination
   a rigid link,
   a pair of flexible joints separated by said link,
   said joints respectively comprising coupling points,
   said link including a portion extending beyond one of said coupling points, said portion being disposed about the joint and the portion of the machine element adjacent thereto,
   said extended portion including means comprising a counterweight, and
   said counterweight comprising a means such that coupling points are made to be points of percussion relative to one another for preventing transmission of vibration therebetween.

3. A linkage for transmitting torque between machine elements arranged and constructed to eliminate the transmission of vibration, having in combination
   a rigid link,
   a pair of flexible joints separated by said link,
   said joints respectively comprising coupling points,
   means comprising a counterweight forming a portion of said link adjacent one end thereof beyond one of said coupling points comprising a mass such that said coupling points are made to be points of percussion relative to one another for prevention of transmission of vibration therebetween,
   said link having an end portion extending beyond said one of said coupling points which includes said means comprising said counterweight,
   a boss extending about said link diametrically aligned with said one of said coupling points,
   diametrically opposed bearing means carried by said boss,
   a cup shaped element having an open end to slidingly receive therein said extended end of said link and said boss,
   said element including a pair of slots receiving said opposed bearing means for free movement therebetween with the exception of relative rotational movement, and
   said element freely accommodating said extended end portion.

4. A linkage for transmitting torque between machine elements arranged and constructed to eliminate the transmission of vibration, having in combination
   a rigid link,
   a pair of flexible joints separated by said link,
   said joints respectively comprising coupling points,
   means comprising a counterweight forming a portion of said link adjacent one end thereof beyond one of said coupling points comprising a mass such that said coupling points are made to be joints of percussion relative to one another for prevention of transmission of vibration therebetween,
   a pair of said links connected at the coupling joints at the non-counterweighted ends,
   a second pair of said links connected in like manner as said first mentioned pair of said links,
   a link intermediate said connected coupling points connecting one pair of said links thus connected with another pair of said links thus connected,
   the joints at the counterweighted ends respectively of said first pair and of said second pair of said connected links being connected to separate machine elements,
   said counterweighted ends of said links with respect to each of said machine elements being connected thereto in diametrically opposed relation,
   said link intermediate said connected coupling points holding said respective pairs of joints connected thereto in diametrically opposed relation,
   whereby said counterweight ends of said links in being connected to said machine elements form a torsionally rigid linkage permitting parallel and angular misalignment in transmitting torque as a coupling and attenuating the transmission of radial and axial components of vibration.

* * * * *